United States Patent Office 3,188,334
Patented June 8, 1965

3,188,334
TETRAALKYLLEAD PROCESS EMPLOYING ALKYL ALUMINUM-AMINE CATALYST SYSTEMS
Francis M. Beaird, Jr., and Paul Kobetz, Baton Rouge, La., assignors to Ethyl Corporation, New York, N.Y., a corporation of Virginia
No Drawing. Filed Oct. 22, 1963, Ser. No. 318,075
10 Claims. (Cl. 260—437)

This invention relates to a new and improved process for the catalyzed synthesis of a tetramethyllead product.

It is known that the tetraalkyllead compounds can be made, generally, by the reaction of an alkali metal lead alloy and an alkyl halide, such as a mono sodium lead alloy, NaPb, and an alkyl chloride. The reaction for tetraethyllead is $$4NaPb + 4C_2H_5Cl \rightarrow (C_2H_5)_4Pb + 3Pb + 4NaCl$$

This type of synthesis reaction has been employed for an appreciable period for making large amounts of tetraethyllead. The chemical reaction is operative for other tetraalkylleads, and recently considerable interest has developed in the manufacture and use of tetramethyllead, an appreciably more volatile lead antiknock compound.

The indicated chemical reaction, applied to the manufacture of tetramethyllead is operative, but only very low yields are obtained without a catalyst. Also, a tetramethyllead process presents more drastic control requirements, and requires more rigorous control than the corresponding type of synthesis of tetraethyllead, because of the substantially higher vapor pressure of tetramethyllead and of the methyl chloride used in its synthesis. A substantially improved procedure for the synthesis of tetramethyllead is disclosed in U.S. Patent 3,049,558 by Cook et al. According to the Cook et al. process, a controlled quantity of a class of inert liquid hydrocarbons, provides, in the presence of a catalyst, appreciably greater yields than are achieved when no inert hydrocarbon is present. The hydrocarbons generally are those having an atmospheric boiling point of about 90–150° C. and these are employed in relatively small concentrations based on the lead in the alloy charged. Aluminum type catalysts are highly effective catalysts.

According to the Cook et al. process, yields of the order of 60–75 percent can be obtained, in reaction periods of less than about seven hours.

A problem encountered in tetramethyllead synthesis is frequent difficulty in discharge of reaction mass from commercial scale autoclaves. By reaction mass is meant the mixture of materials present in a reaction zone or autoclave at the termination of reaction, which mixture includes the aforementioned subdivided lead, the tetramethyllead product, alkali metal chloride, minor amounts of non-reacted chloride, and trace impurities or additives. Also present in the reaction mass, is the inert hydrocarbon customarily employed. The major component of the reaction mass is subdivided lead, owing to the abovementioned stoichiometry of the synthesis reaction. The reaction mass resembles a granular mixture and is discharged from autoclaves by rotation of agitator devices having plow elements for transport of the reaction mass to a discharge nozzle or valve. In the course of commercial operations, considerable difficulty has frequently been encountered in this respect. Another difficulty has arisen from the fact that, after using aluminum containing catalysts, apparently the reaction mass also contains a residual amount of active alkyl-aluminum component which is quite susceptible to oxidation or other reaction. This is manifested by fuming or smoking of the reaction mass when exposed too gaseous atmospheres, even when such atmospheres are relatively free of oxygen. Such fuming necessitates the extensive use of particularly pure inert gas to partly alleviate the problem. The fuming or smoking is especially disadvantageous in that such fumes appear to deposit solids in subsequent heat exchanger equipment, which significantly fouls and reduces the capacity of such equipment. Apparently even commercial gases considered sufficiently pure to be classed "inert" included impurities of a fume initiating or inducing type.

The general object of the present invention is to provide a new and novel process for the effective and economical synthesis of tetramethyllead. Another object is to provide reaction masses, or reaction mixtures, which are facile with respect to physical handling and with respect to avoidance of fumes which are disadvantageous to processing. Another object is to provide a tetramethyllead synthesis process employing as catalysts a two component system, i.e., having provided the reaction members of two different classes of additives as hereafter described.

The process of the present invention involves reacting methyl chloride and a subdivided sodium lead alloy, usually mono-sodium lead alloy, NaPb, but not necessarily at this exact composition. The reaction is carried out in the presence of a catalyst system provided generally as hereafter described by adding an aluminum catalyst and a member of a group of certain amine type components. The aluminum catalyst is preferably provided by supplying a lower alkyl-trialkyl aluminum component or a lower alkyl-alkyl aluminum chloride compound. In certain cases, the aluminum catalyst can be provided by supplying subdivided aluminum metal or aluminum trihalide, particularly aluminum trichloride, but in such instances a slight revision of procedure is required. In these instances, the aluminum catalyst component is provided in advance of the amine component, and is converted at reaction conditions to an alkyl aluminum compound.

The amine compound provided is selected from the group consisting of lower alkyl amines of from two to three alkyl groups, and ethylene diamines.

Typical aluminum catalyst compounds suitable for the process of the invention include trimethyl aluminum, triethyl aluminum, ethyl aluminum sesquichloride, diethyl aluminum chloride, ethyl aluminum dichloride, tri-n-propyl aluminum, tri-n-butyl aluminum, tri-isobutyl aluminum, di-isobutyl aluminum hydride, trioctyl aluminum, diethyl aluminum hydride, and others of this character. Generally, then, the alkyl groups of the aluminum compounds, or mixtures thereof, have up to about ten carbon atoms. Certain aryl radicals can be substituted—thus a phenyl aluminum compound is generally the equivalent of an alkyl aluminum compound, but is more expensive.

Illustrative examples of the amine compounds provided as catalyst additives are tri-n-butyl amine, tri-isobutyl amine, tri-n-propyl amine, tri-isopropyl amine, di-isopropyl amine, dihexyl amine, trihexyl amine, trioctyl amine, trimethyl amine, ethylene diamine, and diethylene diamine. When the amine component is a lower alkyl amine, the alkyl groups generally have from one to 10 carbon atoms, from one to four carbon atom alkyl groups being preferred.

The preferred concentration of alkyl aluminum compounds is, as illustrated, of the order of about 0.1 to 0.3 weight percent aluminum content, based on the alloy, but concentrations of as low as 0.04 and as high as 0.5 weight percent aluminum are frequently employed. With respect to the relative proportions of the amine adjuvent, ratios of from about ½ to 5 moles per gram atom of aluminum can be employed with good results, the preferred proportions being from about ½ to one mole per gram atom of aluminum.

In carrying out the process, by a cyclic type operation, a reaction zone is charged with subdivided solid monosodium lead alloy, and thereafter is reacted with methyl chloride at reaction conditions. Various modes of supplying the catalyst components are quite effective. Thus, in the most common class of embodiments, an inert liquid hydrocarbon is also charged in somewhat limited proportions, and in such instances the catalyst components can be dissolved in said hydrocarbon. The hydrocarbon when used is usually in proportions of about 1/25 to about 1/4 of the alloy by weight. In other cases, the catalyst can be dissolved in the methyl chloride supply and is thereby fed during the entire course of supply of this methylating reagent.

After the initial charge of alloy, the reactor is sealed except for necessary venting connections. The temperature is raised to, usually, about 65° C. or above, while the system is agitated, and methyl chloride is charged. The methyl chloride in some cases is charged all at one time, and in other cases is fed in over a deliberate finite period. The total methyl chloride is provided in proportions of at least one stoichiometric requirement or theory, and usually, a substantial excess is used. It will be understood that this refers to the total quantity fed during batch operations. During portions of such cyclic operations, only minor quantities of methyl chloride may be present, when the feed is "spread out" over a finite period.

The materials thus charged together are then reacted at temperatures averaging from about 85 to 110° C. Agitation is provided throughout the reaction period, as the reacting system includes solids and volatile liquids. The reaction is continued to completion, requiring from about one hour and less than seven hours, dependent on the configuration of the apparatus, the degree of agitation, and the quantity of alloy to be reacted.

On completion of the reaction, the autoclave and contents are cooled and discharged, and the tetramethyllead is recovered from the lead and alkali metal chloride components of the reaction mass. When small portions of hydrocarbon additive are employed in the synthesis reaction the tetramethyllead is usually accompanied on recovery by said hydrocarbon liquid.

As already noted, the present invention provides high yields, in addition to other benefits. To illustrate the general mode of operation, and the results heretofore obtained, a series of "base line" operations were conducted, showing generally the procedure already mentioned, except that the only additives or catalysts for the process were hydrocarbon aluminum compounds.

In these operations, in each run, an autoclave was charged with 1,000 parts of comminuted monosodium lead alloy, containing 10 weight percent sodium. A mixture of an aluminum type catalyst, dissolved in anhydrous toluene, was then charged, while agitating the contents of the autoclave. The said solution was provided in proportions of about 54 parts toluene by weight, and the aluminum catalyst was charged in proportions of about 0.24 weight percent aluminum content based on the alloy charged. According to the identity of the aluminum catalysts, of course, the weight of the catalyst compound would be varied. Thus, in the case of using methyl aluminum sesquichloride, $(CH_3)_3Al_2Cl_3$, as the aluminum type catalyst, a typical concentration was about 9.26 parts per 1,000 parts of the monosodium lead alloy charged.

The charge thus established was then sealed in the autoclave and preheated to about 95° C., and then methyl chloride was fed to the autoclave interior. The temperature was controlled below about 110° C., and the methyl chloride was fed during a period of less than about 30 minutes in proportions corresponding to 1.7 "theories," or about 370 parts by weight per 1,000 parts of the alloy charged.

Upon completion of the reaction, after additional reaction for a period of approximately two hours, the contents of the autoclave were cooled and removed from the interior. The amount of tetramethyllead produced was determined by its extraction from the reaction mixture, or reaction mass, with a hydrocarbon solvent and by reaction of the tetramethyllead with iodine of an aliquot of the liquid extract, followed by back titration. Alternatively, in some instances, the reaction mass was subjected to steam distillation, for separation of the tetramethyllead from the excess lead solids and sodium chloride component of the reaction mass.

A series of operations as above described was carried out, using the procedure indicated. Using triethyl aluminum as the catalyst, the average yield in a substantial number of operations obtained was about 78 percent, and when using methyl aluminum sesquichloride as a catalyst in comparable concentrations, the average yield was 77 percent. In this series of operations, and in others using the same apparatus and technique, but with significantly decreased catalyst concentration, it was found that the indicated aluminum catalyst concentration level was necessary for reproducible yields approaching or equal to the average yield mentioned. Comparable yields were occasionally obtained at lower concentrations, but were not consistently obtained. Generally, the yield appeared to decrease linearly with the aluminum catalyst concentration below the indicated level, but the most effective aluminum catalyst concentration will vary with different reactors and processing techniques.

The reaction mass attained in the above described base line runs was quite reactive, in that, when portions were exposed to the atmosphere, considerable fuming occured. The fuming is attributed to the existence in the reaction mass of aluminum hydrocarbon moieties, expressed as alR. These groups, wherein al is the monovalent equivalent and R is a hydrocarbon or a hydrogen, are capable of reacting with oxygen and releasing microscopic particles of aluminum oxide. These particles are so fine that they appear as a fog and tend to foul heat exchange surfaces in recovery equipment.

To illustrate the operation of the present invention, the following working examples are given.

*Example 1*

In this operation, the procedure described for the base line runs was followed, except that the aluminum catalyst, in this case, methyl aluminum sesquichloride, was provided at about one-half the concentration, i.e., in proportions of 0.46 weight percent, based on the alloy, and in addition tri-n-butyl amine was concurrently charged, in the proportions of about 0.5 mole per gram atom of the aluminum in the methyl aluminum sesquichloride.

Upon completion of the reaction, it was found that a yield of 70.5 percent of tetramethyllead had been obtained, although only about one-half as much methyl aluminum sesquichloride was used as in the base line runs. As the yields of tetramethyllead at the operating conditions used are roughly proportional to the concentration of aluminum catalyst, it is seen that the co-presence of the tri-n-butyl amine increased the efficiency of the methyl aluminum sesquichloride by about one-half or better. In addition, the reaction mass was less reactive than in the case of base line runs and was more readily discharged.

In the foregoing example, as indicated, the aluminum catalyst plus the tri-n-butyl amine were added in full at substantially the same time. In other operations, alternative modes of introducing the plural catalyst components have been employed. For example, one highly effective mode of addition is to dissolve the catalysts in the methyl chloride so that it is introduced uniformly with the methyl chlorine feed. The amine component can be added somewhat later than the aluminum catalyst if desired, as long as it is present during a substantial portion of the reaction.

Although, as illustrated by Example 1, the co-addition of an amine, according to the present process, substantially improves the unit effectiveness of an aluminum catalyst when used at lower than normal concentrations, it is preferable to employ the aluminum catalyst at about the normal concentration with the amine added for the supplemental benefits of greater reproducibility and improvements in characteristics of the reaction mass.

The following table cites the results obtained in additional working examples, using the hydrocarbon aluminum compounds and other examples of amine adjuvants.

| Example | Aluminum Catalyst | | Amine Adjuvant | | Yield of tetramethyllead, Percent |
|---|---|---|---|---|---|
| | Compound | Concentration, Wt. Percent Al Based on Alloy | Amine | Concentration, Moles/ Atom Al | |
| 2 | Triethyl aluminum. | 0.25 | Ethylene diamine. | 0.64 | 79.4 |
| 3 | Methyl aluminum sesquichloride. | 0.25 | Di-n-butyl amine. | 0.52 | 65 |
| 4 | ___do___ | 0.25 | Diethylene diamine (piperazine). | 0.51 | 64 |
| 5 | ___do___ | 0.25 | Tripropyl amine. | 0.3 | 76.6 |

The foregoing examples illustrate generally the mode of operating according to the present invention. When trimethyl aluminum, tri-isobutyl aluminum, diethyl aluminum chloride, dihexyl aluminum chloride, tri-octyl aluminum, diethyl butyl aluminum and other alkyl aluminum compounds, or mixtures thereof, are substituted for the alkyl aluminum compounds used in the foregoing examples, similar results are obtained. Similarly, when triethyl amine, diethyl amine, trihexyl amine, or ethyl dipropyl amine, or mixtures thereof, are substituted for the specific examples above, or in conjunction with the alternative alkyl aluminum compounds cited above, comparable results will be achieved.

What is claimed is:
1. The process of manufacture of tetramethyllead comprising reacting sodium lead alloy with methyl chloride and in the presence of catalyst components including
    (a) an alkyl aluminum compound selected from the group consisting of lower alkyl aluminum trialkyls and lower alkyl aluminum chlorides, and
    (b) an amine selected from the group consisting of a lower alkyl amine having from 2 to 3 alkyl groups, ethylene diamine and diethylenediamine.

2. The process of manufacture of tetramethyllead comprising reacting sodium lead alloy with methyl chloride and in the presence of catalyst components including
    (a) an alkyl aluminum compound selected from the group consisting of lower alkyl aluminum trialkyls and lower alkyl aluminum chlorides, the alkyl aluminum compound being in proportions providing an aluminum content of from 0.04 to about 0.5 weight percent based on the alloy, and
    (b) an amine selected from the group consisting of a lower alkyl amine having from 2 to 3 alkyl groups, ethylene diamine and diethylenediamine, the amine being in the proportions of from about one-half to five moles per gram atom of aluminum in the alkyl aluminum compound.

3. The process of manufacture of tetramethyllead comprising reacting sodium lead alloy with methyl chloride and in the presence of catalyst components including
    (a) an alkyl aluminum compound selected from the group consisting of lower alkyl aluminum trialkyls and lower alkyl aluminum chlorides, the alkyl aluminum compound being in proportions providing an aluminum content of from 0.04 to about 0.5 weight percent based on the alloy, and
    (b) tri-n-butyl amine.

4. The process of manufacture of tetramethyllead comprising reacting sodium lead alloy with methyl chloride and in the presence of catalyst components including
    (a) methyl aluminum sesquichloride, and
    (b) an amine selected from the group consisting of a lower alkyl amine having from two to three alkyl groups, ethylene diamine and diethylene diamine.

5. The process of claim 4 further defined in that the amine is ethylene diamine.

6. The process of manufacture of tetramethyllead comprising reacting sodium lead alloy with methyl chloride and in the presence of catalyst components including
    (a) triethyl aluminum, and
    (b) an amine selected from the group consisting of a lower alkyl amine having from two to three alkyl groups, ethylene diamine and diethylene diamine.

7. The process of manufacture of tetramethyllead comprising reacting sodium lead alloy with methyl chloride and in the presence of catalyst components including
    (a) an alkyl aluminum compound selected from the group consisting of lower alkyl aluminum trialkyls and lower alkyl aluminum chlorides, the alkyl aluminum compound being in proportions providing an aluminum content of from 0.04 to about 0.5 weight percent based on the alloy, and
    (b) dibutyl amine.

8. The process of manufacture of tetramethyllead comprising reacting sodium lead alloy with methyl chloride and in the presence of catalyst components including
    (a) methyl aluminum sesquichloride, and
    (b) dibutyl amine.

9. The process of manufacture of tetramethyllead comprising reacting sodium lead alloy with methyl chloride and in the presence of catalyst components including
    (a) an alkyl aluminum compound selected from the group consisting of lower alkyl aluminum trialkyls and lower alkyl aluminum chlorides, the alkyl aluminum compound being in proportions providing an aluminum content of from 0.04 to about 0.5 weight percent based on the alloy, and
    (b) diethylene diamine.

10. The process of manufacture of tetramethyllead comprising reacting sodium lead alloy with methyl chloride and in the presence of catalyst components including
    (a) methyl aluminum sesquichloride, and
    (b) diethylene diamine.

No references cited.

TOBIAS E. LEVOW, *Primary Examiner.*